United States Patent [19]

Kraft et al.

[11] 4,098,581

[45] Jul. 4, 1978

[54] GAS RELEASE DEVICE FOR USE WITH LABORATORY GLASSWARE

[76] Inventors: Jack A. Kraft, 119 Elm La., New Hyde Park, N.Y. 11040; Harold D. Kraft, 147-14 70th Ave., Flushing, N.Y. 11367

[21] Appl. No.: 718,588

[22] Filed: Aug. 30, 1976

[51] Int. Cl.² .......................... B01L 3/00; F16K 15/06
[52] U.S. Cl. ................................. 23/292; 137/543.13; 137/798; 251/368
[58] Field of Search .................... 137/542, 543.13, 798; 251/368; 23/292, 259; 285/DIG. 12

[56] References Cited

U.S. PATENT DOCUMENTS

| 970,348 | 9/1910 | Osborne | 137/543.13 X |
|---|---|---|---|
| 2,129,502 | 9/1938 | McCreary | 23/292 X |
| 2,539,082 | 1/1951 | Hustiny | 23/292 |
| 3,323,874 | 6/1967 | Phillips | 251/368 X |
| 3,955,930 | 5/1976 | Shapiro | 23/259 |

*Primary Examiner*—William R. Cline
*Attorney, Agent, or Firm*—Peter L. Berger

[57] ABSTRACT

A gas release device for airtight connection with the mouth of an article of laboratory glassware having a mouth for sealing the article against the entry of air from the ambient while permitting the escape of gases generated in the article comprises a fitting means for effecting an airtight seal with the mouth of the article of laboratory glassware, check valve means for preventing the entry of air from the ambient and permitting the escape of gases generated in the article and conduit means communicating between the fitting means and the check valve means.

6 Claims, 2 Drawing Figures

GAS RELEASE DEVICE FOR USE WITH LABORATORY GLASSWARE

BACKGROUND OF THE INVENTION

This invention relates to a gas release device for use with an article of laboratory glassware. More particularly, the device to which the present invention relates seals the article of laboratory glassware against the entry of air from the ambient while permitting the escape of gases generated in the article.

As is well known by chemists, a separatory funnel, which is a particular article of laboratory glassware, is utilized for laboratory extractions. Typically, the separatory funnel is charged with a first liquid containing a substance which is to be extracted and a second liquid, immiscible with the first, which is to extract the substance. The contents of the separatory funnel are then vigorously shaken. While performing this operation, the chemist or technician frequently finds it convenient to hold the separatory funnel with the axis thereof generally horizontal. While thus holding the funnel, the chemist or technician may periodically interrupt the shaking to open the stopcock of the separatory funnel to release gases which may have been generated in the funnel during the mixing. For the same purpose, the chemist or technician will frequently also open the stopcock at the conclusion of the mixing operation. When the stopcock is opened, the liquid contents of the separatory funnel will not escape because the separatory funnel is being held in a tipped position and, to assure thorough mixing, is less than half full.

One disadvantage of this technique is that it requires manipulation of the stopcock while holding the separatory funnel sideways, which might cause the chemist or technician to drop the separatory funnel. Another disadvantage is that the periodic interruption of the shaking to manipulate the stopcock is timeconsuming. Moreover, one cannot simply mount the separatory funnel on a mechanical agitator, actuate the agitator and leave the funnel unattended until the agitating operation is completed. Yet another disadvantage is that if the stopcock should be opened at such time that the pressure in the separatory funnel is atmospheric or below, ambient air, which might contaminate the contents of the funnel, will be drawn into the funnel.

It is an object of the invention to provide a gas release device for airtight connection with the mouth of an article of laboratory glassware such as a separatory funnel which will be substantially free of the aforementioned disadvantages. Other objects and advantages of the invention will be apparent from the following detailed description thereof.

SUMMARY OF THE INVENTION

According to the invention, there is provided a gas release device for airtight connection with the mouth of an article of laboratory glassware having a mouth for sealing the article against the entry of air from the ambient while permitting the escape of gases generated in the article, comprising a fitting means for effecting an airtight seal with the mouth of the article of laboratory glassware, check valve means for preventing the entry of air from the ambient and permitting the escape of gases generated in the article and conduit means communicating between the fitting means and the check valve means. Preferably, the fitting means and the conduit means are integral and the check valve means includes a housing integral with the conduit means. The check valve means may include a valve seat means. The valve seat means may be integral with the housing and conduit means. Alternatively, a replaceable valve seat may be provided. The check valve means may include an aperture formed through the housing upstream from the valve seat means for permitting the release to the ambient of gases passing through the valve seat when the valve is open. The check valve means include closure means for sealing the valve seat on the upstream side of the valve seat. The sealing means may comprise a stem having one end formed for airtight engagement with the valve seat and the biasing means may comprise a helical spring surrounding the stem coaxially with the stem and having one end engaging the stem. Adjustable means for compressing the spring may be provided. More particularly, the adjustable means may comprise an externally threaded stopper having an annular shoulder for engaging the other end of the spring and an internally threaded bore formed in the housing of the check valve means and receiving the stopper. The conduit may be angulated, preferably to form an obtuse angle, so that when the device is connected to the mouth of the article of laboratory glassware containing a fluent material and the article of laboratory glassware is positioned with the axis of the mouth oriented substantially horizontally, the check valve means is above the level of the fluent material.

DESCRIPTION OF A PREFERRED EMBODIMENT

Figure 1:
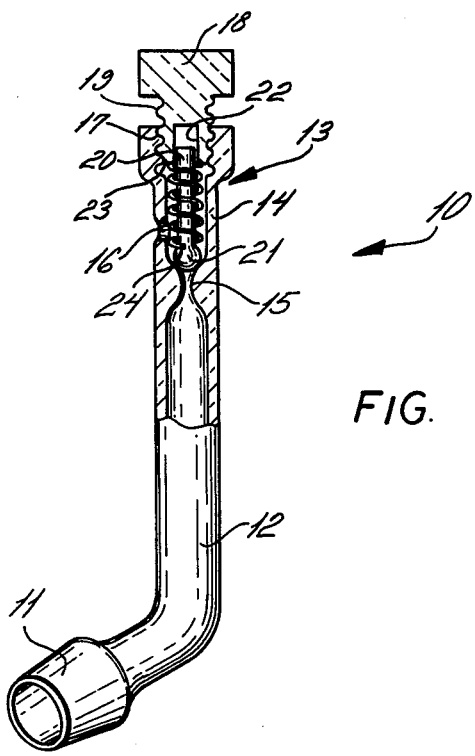
Figure 2:
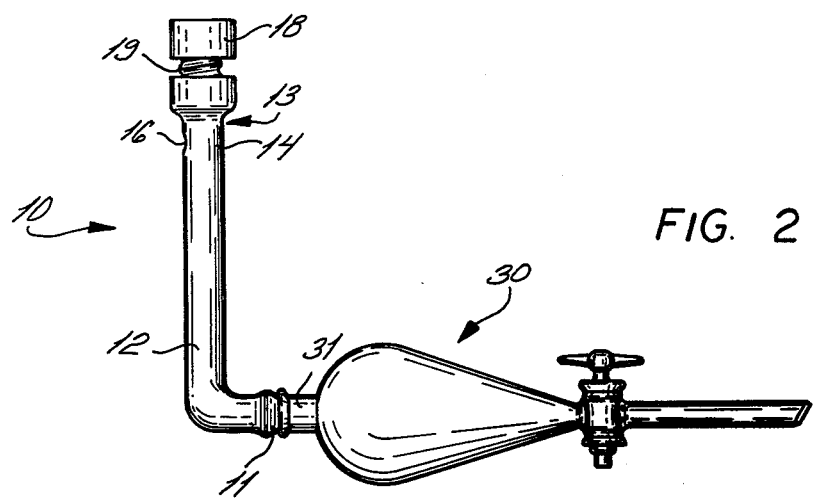

The invention will now be further described by reference to a specific, preferred embodiment, as illustrated in the drawings, in which:

FIG. 1 is an isometric view, partly broken away, of a gas release device according to the invention; and FIG. 2 is a side view of a gas release device according to the invention in combination with a separatory funnel.

With reference to FIG. 1, it is seen that the gas release device 10 according to the invention comprises a fitting means such as taper joint 11, an angulated conduit 12 and a check valve means 13. The check valve means 13 includes a housing 14 which is integral with the conduit 12 and the conduit 12 is integral with the taper joint 11. Typically, but not necessarily, the entire construction, except for the hereinafter described spring, is fabricated of glass.

A valve seat 15 is formed integrally with the housing 14. Upstream from the valve seat 15, through the housing 14 is formed an aperture 16.

An internally threaded bore 17 is formed in the end of the housing 14 remote from the taper joint 11. A stopper 18 provided with external threads 19 is screwed into the bore 17. A closure means is provided in the form of a stem 20 having a generally spherical closure end 21 for sealing engagement with the valve seat 15. The stopper 18 is formed with a blind bore 22. The periphery of the lower extremity of the stopper 18, consequently, constitutes an annular shoulder 23. The diameter of the bore 22 is slightly greater than the diameter of the stem 20 whereby the stem 20 is loosely received in the bore 22. Also, a clearance is provided between the top of the stem 20 and the bottom of the bore 22.

A steel helical spring 24 loosely surrounds the stem 20. The lower end of the helical spring 24 engages against the upper portion of the spherical end 21 of the stem 20. The shoulder 23 formed on the stopper 18 engages the upper end of the helical spring 24 whereby the helical spring is held under compression. The amount of compression of the spring 24 is adjusted simply by twisting the stopper 18.

With reference to FIG. 2, the device 10 of the invention is seen in combination with a conventional separatory funnel 30, the taper joint 11 of the device 10 being received with an airtight fit in the mouth 31 of the separatory funnel 30.

The device according to the invention is exceedingly simple to use. The separatory funnel is charged in the conventional manner with the liquid from which a substance is to be extracted and the liquid which is to extract the substance. However, then, instead of being closed with the conventional stopper, the taper joint 11 of the device of the invention is inserted in the mouth of the separatory funnel. The separatory funnel is then held in the orientation shown in FIG. 2, that is, with the axis of the separatory funnel substantially horizontal and the far extremity of the device 10 of the invention extending substantially vertically upwards. The stopper 18 has been preadjusted so that a pressure in excess of one pound per square inch above atmospheric pressure in the separatory funnel will cause the end 21 of the stem 20 to be lifted from the seat 15, thereby permitting gases accumulated in the separatory funnel to escape through the aperture 16. When the pressure, thus, falls below one pound per square inch, the end 21 of the stem 20 will re-seat on the seat 15. It will be appreciated that the figure of one pound per square inch is given only by way of example. If desired, at the end of the mixing operation, one may untwist the stopper 18 sufficiently so that it no longer bears or bears only lightly on the spring 24, thereby assuring that any residual gases are released from the separatory funnel. If it is desired at any time to use the device of the invention simply as one would use a conventional stopper, the stopper 18 may be twisted into the bore 17 to an extent that it bears against the spring 24 with such force that the spherical end 21 of the stem 20 is pressed against the valve seat 15 with sufficient force to form a gas-and liquid-tight seal.

It will be appreciated that the bent configuration of the illustrated device, much like a snorkel tube, is adapted particularly for use with a separatory funnel in an orientation illustrated in FIG. 2. The angulation of the device is necessary to keep the liquid or other fluent material in the separatory funnel out of contact with the check valve means. On the other hand, if the separatory funnel were not held in a horizontal orientation for the mixing, but, rather, where held vertically, then the device according to the invention need not be angulated.

Alternatively, the gas release device or check valve means and article of laboratory glassware may be combined into a single unit, such as by installing the check valve means over or otherwise integrally associating the check valve means with an aperture in the glassware.

While the invention has been particularly described with reference to a specific embodiment thereof, it is to be understood that this embodiment is intended to illustrate rather than limit the invention.

What is claimed is: developed during the ambient airtight

1. For a separatory funnel of the type adapted to be shaken horizontally and having a stopcock for release of gases developed furing the horizontal shaking, the invention comprising a gas release device for airtight connection with the mouth of said separatory funnel for sealing the article against the entry of air from the abmient while permitting the escape of gases generated in the funnel, said device comprising a fitting means for effecting an air-tight seal with said mouth, check valve means for preventing the entry of air from the ambient and permitting the escape of gases generated in the funnel, conduit means integrally formed with said fitting means communicating between the fitting means and the check valve means, said check valve means including a housing being integral with the conduit means and a valve seat means, said check valve means including an aperture formed through the housing upstream from the valve seat means for permitting the release to the ambient of gases passing through the valve seat when the valve is open, and closure means for sealing the valve seat and means biasing the closure means against the valve seat on the upstream side of the valve seat, further comprising said conduit being angulated whereby when the device is connected to said mouth and said separatory funnel contains a fluent material and is shaken in a horizontal direction and the funnel is positioned with the axis of the mouth oriented substantially horizontally the check valve means is substantially above the level of the fluent material to permit the automatic release of gases in the funnel to the ambient while maintaining the liquid in the funnel.

2. A device according to claim 1, in which said sealing means comprises a stem having one end formed for airtight engagement with the valve seat and the biasing means comprises a helical spring surrounding the stem coaxially with the stem and having one end engaging the stem.

3. A device according to claim 2, further comprising adjustable means for compressing the spring.

4. A device according to claim 3, in which said adjustable means comprises an externally threaded stopper having an annular shoulder for engaging the other end of the spring and an internally threaded bore formed in he housing of the check valve means and receiving the stopper.

5. A device according to claim 3, in which the adjustable means are capable of compressing the spring sufficiently that the check valve remains closed, and consequently, the device functions simply as a stopper.

6. The combination of a device according to claim 1 and a separatory funnel, the fitting means of the device effecting an airtight seal with the funnel.

* * * * *